United States Patent [19]

Lohrbach et al.

[11] 4,279,379
[45] Jul. 21, 1981

[54] CARTON WITH SELF-LOCKING END CLOSURE AND BLANK FOR FORMING SAME

[75] Inventors: Mervin Lohrbach, Garden Grove; Dick E. Peeples, Capitola, both of Calif.

[73] Assignee: Champion International Corporation, Stamford, Conn.

[21] Appl. No.: 152,736

[22] Filed: May 23, 1980

Related U.S. Application Data

[63] Continuation-in-part of Ser. No. 94,492, Nov. 15, 1979.

[51] Int. Cl.³ .............................................. B65D 5/10
[52] U.S. Cl. .................................. 229/39 R; 229/41 B
[58] Field of Search ................ 229/39 R, 41 B, 41 R

[56] References Cited

U.S. PATENT DOCUMENTS

| 1,546,601 | 7/1925 | Morris | 229/39 R |
|---|---|---|---|
| 2,337,198 | 12/1943 | Holy | 229/39 R |
| 2,361,603 | 10/1944 | Cohen et al. | 229/39 R |
| 2,713,965 | 7/1955 | Acker | 229/39 R |
| 2,779,527 | 1/1957 | Fallert | 229/39 R |
| 2,934,254 | 4/1960 | Ullger | 229/41 B |
| 3,178,096 | 4/1965 | Reeves et al. | 229/41 B X |
| 3,302,853 | 2/1967 | Locke | 229/39 R |
| 3,819,105 | 6/1974 | Heimann | 229/41 B X |

FOREIGN PATENT DOCUMENTS

| 76583 | of 1948 | Czechoslovakia | 229/39 R |
|---|---|---|---|
| 103931 | 3/1966 | Denmark | 229/41 B |

*Primary Examiner*—Davis T. Moorhead
*Attorney, Agent, or Firm*—Evelyn M. Sommer

[57] ABSTRACT

A self-locking, reusable carton is formed from a unitary blank of paperboard. The carton and blank have self-locking end closure flaps which are hingedly coupled to adjacent end edges of the side panels of the carton. The closure flaps include two flaps with L-shaped slits formed therein and a locking flap free of fold lines with a locking tab at the free end thereof. During assembly the locking flap is forced downwardly to place the locking tab in the L-shaped slits to lock the carton in its fully assembled configuration.

2 Claims, 4 Drawing Figures

CARTON WITH SELF-LOCKING END CLOSURE AND BLANK FOR FORMING SAME

CROSS-REFERENCE TO RELATED APPLICATION

This application is a continuation-in-part of U.S. patent application Ser. No. 94,492, filed Nov. 15, 1979.

BACKGROUND OF THE INVENTION

The present invention relates to a carton with a self-locking end closure and a blank for forming the carton. More particularly, the invention relates to a collapsible self-locking end closure structure which permits shipment and storage of the partially assembled carton in a flat, collapsed configuration, while permitting complete assembly and set-up by a simple manual operation without the use of glue, tape or stitches.

In constructing cartons or containers for such articles as meat, produce, potato chips, flowers, fish and industrial commodities, it is necessary to form an end closure arrangement which may be simply and quickly assembled and disassembled. In the disassembled configuration of the carton, the carton must be capable of being shipped and stored in a flat, collapsed configuration to use shipping and storage space efficiently. Otherwise, the carton would waste considerable space and prevent economical shipment and storage of the carton.

Cartons which are sealed and closed by glue, tape or stitches become torn upon opening, thereby weakening the carton. This weakening of the carton limits the number of times an individual carton can be reused. Additionally, the use of glue, tape and stitches involves relatively complex operations requiring substantial expenditures of time and skilled personnel.

Conventional self-locking cartons involve the use of additional paperboard material to form additional panels or flaps for retaining the carton in an assembled configuration. These conventional cartons waste paperboard material and are difficult and time-consuming to assemble.

SUMMARY OF THE INVENTION

Accordingly, an object of the present invention is to provide a carton and a blank for forming a carton with a collapsible, self-locking end closure arrangement so that the carton may be shipped and stored in a flat, partially assembled, collapsed configuration.

Another object of the present invention is to provide a carton and a blank for forming a carton with a self-locking end closure arrangement that may be quickly and simply converted from a partially assembled, collapsed configuration to a fully assembled configuration without skilled personnel and without the use of glue, tape or stitches.

An additional object of the present invention is to provide a carton and a blank for forming same which is reusable in that it is not easily damaged or torn during assembly and disassembly thereof.

A further object of the present invention is to provide a carton and a unitary blank for forming a carton of rugged construction which is simple and inexpensive to manufacture, assemble and use.

The foregoing objects are attained by providing a planar, unitary blank for forming a carton with a self-locking end closure comprising first, second, third and fourth side panels hingedly coupled in series at adjacent side edges thereof along fold lines, and first, second, third and fourth closure flaps hingedly coupled to the first, second, third and fourth side panels, respectively, at adjacent end edges thereof along fold lines, the first flap having a base portion adjacent the first panel and a locking tab remote from the first panel and being free of fold lines, each of the second and fourth flaps having an L-shaped slit therein.

The foregoing objects are also attained by a carton with a self-locking end closure comprising first, second, third and fourth side panels hingedly coupled at adjacent side edges thereof along fold lines, and first, second, third and fourth closure flaps hingedly coupled to the first, second, third and fourth side panels, respectively, at adjacent end edges thereof along fold lines, the first flap having a base portion adjacent the first panel and a locking tab remote from the first panel and being free of fold lines, each of the second and fourth flaps having an L-shaped slit therein.

By forming the carton and blank of the present invention in this manner, a carton may be provided which may be partially formed and shipped in a flat, collapsed configuration and then easily and quickly rearranged to a fully assembled configuration in which the end closure of the carton is secured without glue, tape, stitches or other separate fastening mechanisms. The self-locking end closure arrangement permits the carton to be finally assembled by a simple and quick manipulation by unskilled personnel. Additionally, this arrangement permits maximum reuse of the carton and efficient use of the material used to form the carton. Thus, the present invention permits cartons formed with self-locking end closures to be easily and economically manufactured, shipped, stored and used.

Other objects, advantages and salient features of the present invention will become apparent from the following detailed description, which taken in conjunction with the annexed drawings, discloses a preferred embodiment of the present invention.

BRIEF DESCRIPTION OF THE DRAWINGS

Referring to the drawings which form a part of this original disclosure.

DETAILED DESCRIPTION OF THE PREFERRED EMBODIMENT OF THE INVENTION

The carton 10 in its assembled configuration has four side panels, 12, 14, 16, 18. Panels 12, 16 are opposed and parallel to each other. Panels 14, 18 are opposed and parallel to each other and perpendicular to the side panels 12, 16. These panels are coupled along their adjacent side edges. A collapsible self-locking end closure arrangement 20 is hingedly coupled to the side panels 12, 14, 16, 18 at the top end edges thereof.

Figure 1:
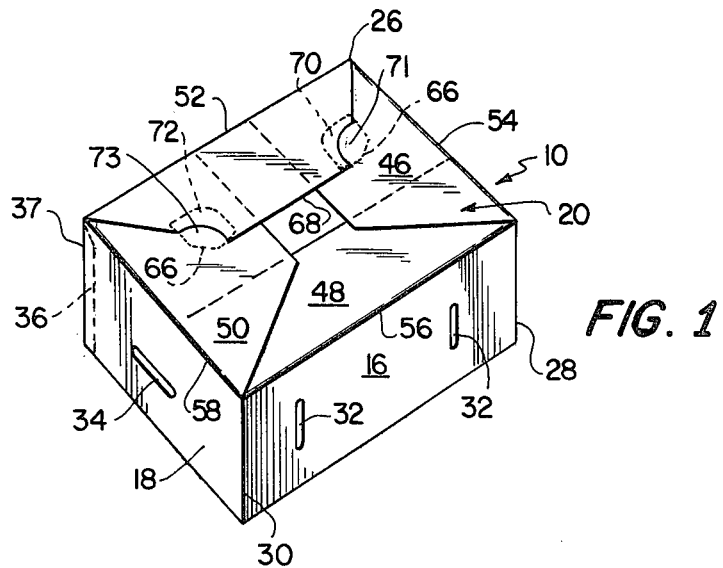
FIG. 1 is a perspective view illustrating the carton of the present invention in its fully assembled, closed configuration.
Figure 2:
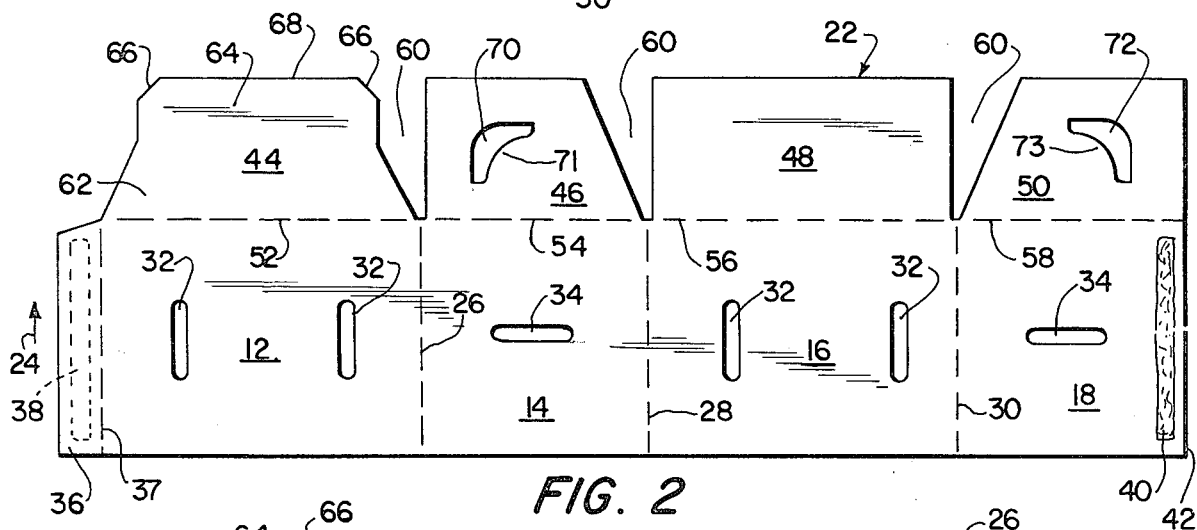
FIG. 2 is a plan view illustrating the interior surface of a blank for forming the carton of FIG. 1.

The blank 22 for forming the carton 10 is illustrated in FIG. 2. The blank 22 may be formed of a unitary piece of paperboard of suitable weight and thickness, preferably corrugated cardboard. The weight and thickness of the cardboard depends on the size and weight of the articles to be contained within the carton. FIG. 1 illustrates the surface of the blank 22 which will form the interior of the carton. Preferably, the corrugations are oriented in directions parallel to line 24.

The main portion of the blank comprises the side panels 12, 14, 16, 18 which are rectangular in shape. The side panels 12, 14, 16, 18 are hingedly coupled in series at adjacent side edges thereof along fold lines 26, 28, 30, respectively. The dimension of panels 12, 16 in a direction perpendicular to fold lines 26, 28, 30 is greater than the dimension of panels 14, 18 in that direction so that the carton 10 has a cross-sectional configuration which is not square.

The first and third side panels 12, 16 are provided with elongated, vertically extending apertures 32 for venting the carton 10. The second and fourth side panels 14, 18 have elongated, horizontally extending handle openings to facilitate lifting and carrying of the carton 10.

A glue flap 36 in the form of a right trapezoid is hingedly coupled at its longer parallel base to the side edge of the first side panel 12 remote from the second side panel 14 along fold line 37. A glue area 38 is provided on the exterior surface of the flap 36. A glue area 40 is provided on the interior surface of the fourth side panel 18 adjacent the free side edge 42 thereof. The glue areas 38, 42 are shaped and oriented to mate.

Four end closure flaps 44, 46, 48, 50 are attached to and extend from the top end edges of the panels 12, 14, 16, 18, respectively. The first flap 44 is hingedly coupled to the first panel 12 along the fold line 52. The second flap 46 is hingedly coupled to the second panel 14 along the fold line 54. The third flap 48 is hingedly coupled to the third panel 16 along the fold line 56. The fourth flap 50 is hingedly coupled to the fourth panel 18 along the fold line 58. The fold lines 52, 54, 56, 58 are colinear. The adjacent flaps are separated by slots 60 to permit them to be independently folded.

The first flap 44 comprises two portions, a base portion 62 adjacent the first panel 12 and a locking tab 64 remote from the first panel 12. The base portion 62 is in the form of an isosceles trapezoid with its longer parallel base located along the fold line 52. The side edges of the base portion 62 taper inwardly in a direction away from the first panel 12. The locking tab 64 extends from the smaller parallel base of the trapezoidal base portion 62 and has tapered side edges 66 adjacent the free end of the tab 64. Except for the tapering of the side edges 66, the locking tab 64 is generally rectangular in shape.

Between the fold line 52 and the free end edge 68 of the first flap 44, the first flap 44 is free of fold lines. The omission of fold lines in the first flap 44 facilitates assembly of the end closure 20 as will be explained in detail hereinafter.

The second flap 46 is in the form of a right trapezoid with its longer parallel base along the fold line 54. The included right angles are located adjacent the first flap 44. An L-shaped slit 70 with rounded corners is formed in the second flap 46. The legs of the L-shaped slit 70 are of substantially equal length and define a locking flap 71 therebetween. One leg is parallel and remote from the fold line 54, while the other leg is perpendicular and adjacent the fold line 54.

The third flap 48 is rectangular with one of its longer sides oriented along the fold line 56.

The fourth flap 50 is the mirror image of the second flap 46. Accordingly, the fourth flap 50 is in the form of a right trapezoid and has an L-shaped slit 72 with equal legs formed therein defining a locking flap 73.

The carton 10 is formed from the blank 22 by folding the first side panel 12 about fold line 26 until it overlies the interior surfaces of the second and third side panels 14, 16. The glue flap 36 and the first flap 44 remain coplanar with the first panel 12. The fourth side panel 18 is then folded about fold line 30 until the fourth side panel 18 overlies the interior surface of the third side panel 16 and overlies the exterior surface of the glue flap 36 with the free side edge 42 aligned with the fold line 37. In this position, the glue area 38 on the glue flap 36 mates with the glue area 40 on the fourth side panel 18. The adhesive applied to the glue area 38 and/or glue area 40 hingedly couples the first side panel 12 to the fourth side panel 18 along the fold line 37. During folding of the fourth side panel 18, the fourth flap 50 remains coplanar therewith. These assembly steps are usually performed by the carton manufacturer, form the partially assembled, flat, collapsed configuration of the carton 10, and involve the sole gluing step necessary. It is in this flat, collapsed configuration that the carton 10 may be shipped, stored and fully assembled simply, inexpensively and efficiently.

Final assembly of the carton 10 is usually performed at the packing location. The fully assembled configuration of the carton is formed by pivoting the panels 12, 14, 16, 18 about fold lines 37, 26, 28, 30 until the first and third panels 12, 16 are parallel, and the second and third panels 14, 16 are parallel to each other and perpendicular to the first and third panels 12, 16. In this position, the panels 12, 14, 16, 18 form the side walls of the carton 10 and the flaps 44, 46, 48, 50 are still coplanar with their respective panels.

Once the panels 12, 14, 16, 18 have been properly oriented relative to one another, the third flap 48 is pivoted about fold line 56 until it is substantially perpendicular to the panels 12, 14, 16, 18. Thereafter, the second and fourth flaps 46, 50 are pivoted about fold lines 54, 58, respectively, until the flaps 46, 50 overlie the flap 48 and are substantially perpendicular to the panels 12, 14, 16, 18 as illustrated in FIG. 3.

Figure 3:
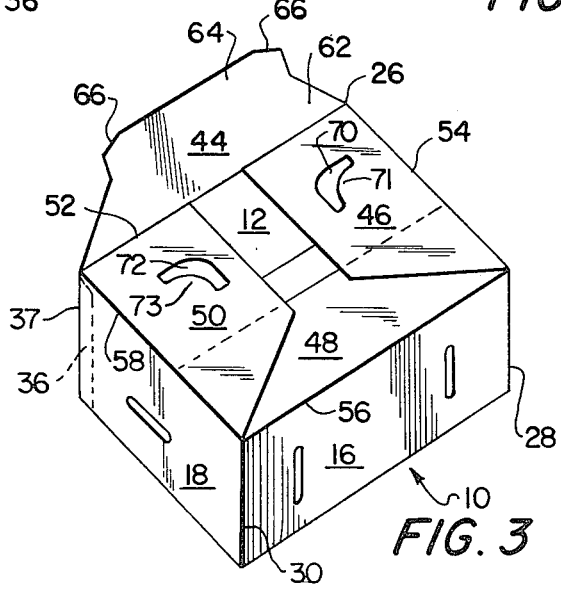
FIGS. 3 and 4 are perspective views illustrating the carton of FIG. 1 in various stages of assembly.
Figure 4:
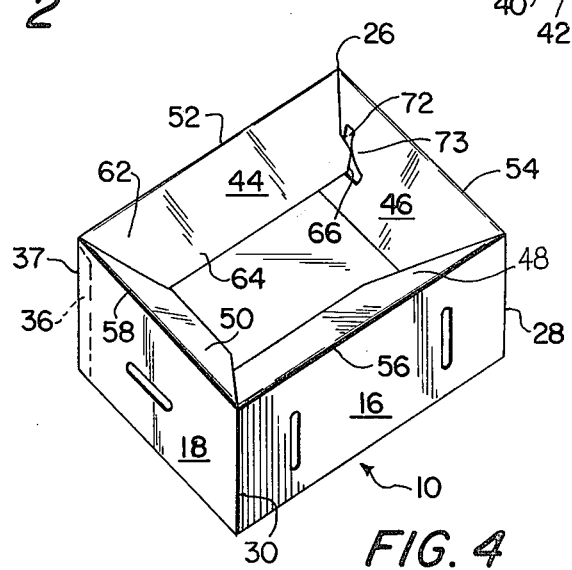

After the flaps 46, 48, 50 have been folded to the FIG. 3 orientation, the first flap 44 is folded about fold line 52 and is forced inwardly against the exterior surfaces of the flaps 46, 50. As illustrated in FIG. 4, the first flap 44 is forced into the interior of the carton 10, thereby forcing the flaps 46, 48, 50 also into the carton interior. The tapered side edges of the first flap base portion 62 avoid interference between the first flap 44 and the second and fourth flaps 46, 50. Force is continuously applied to the first flap 44 until the tapered side edges 66 of the locking tab 64 enter the L-shaped slits 70, 72 in the flaps 46, 50.

Once the tapered edges 66 have entered the slots 70, 72, the locking tab 64 is guided under the locking flaps 71, 73, as the flaps 44, 46, 48, 50 are lifted until these flaps are perpendicular to the panels 12, 14, 16, 18 to achieve the fully assembled configuration of the closure arrangement 20 illustrated in FIG. 1. Since the first flap 44 is free of fold lines, it will not buckle during assembly of the closure arrangement 20 and will form a secure closure. The engagement of the locking tab 64 with the locking flaps 71, 73 self-locks the carton in its fully assembled configuration.

If desired, the carton 10 may be again arranged in its flat, collapsed configuration by simply removing the locking tab 64 from the slits 70, 72. This permits the flaps 44, 46, 48, 50 to be released relative to one another to permit them to be folded towards their flat, collapsed configuration along with the panels 12, 14, 16, 18. In the collapsed configuration, the carton may be easily stored and shipped for reuse or disposal.

By forming the carton 10 and the blank 22 in this manner, the carton may be shipped and stored in a substantially flat, collapsed configuration. The flat, collapsed carton may then be quickly and simply formed into a fully assembled configuration by a simple manual operation in which the end closure flaps of the carton lock themselves into position. Thus, when the carton packer receives the carton in its flat, collapsed configuration, the carton may be simply and quickly assembled manually without glue, tape or stitches by unskilled personnel.

The self-locking end closure arrangement provided by the present invention securely locks the carton in its fully assembled configuration to prevent opening thereof and subsequent damage to the contents.

While a particular embodiment has been chosen to illustrate the invention, it will be understood by those skilled in this art that various changes and modifications can be made therein without departing from the scope of the invention as defined in the appended claims.

What is claimed is:

1. A planar, unitary blank for forming a carton with a self-locking end closure comprising:

first, second, third and fourth side panels hingedly coupled in series at adjacent side edges thereof along fold lines; and first, second, third and fourth closure flaps hingedly coupled to said first, second, third and fourth side panels, respectively, at adjacent end edges thereof along fold lines, said first flap having a base portion adjacent said first panel and a locking tab remote from said first panel, said base portion being substantially in the form of an isoceles trapezoid tapering in a direction away from said first panel, and with said locking tab being substantially rectangular and tapered at its free end thereof in a direction away from said first panel, said first flap being free of fold lines, and with each of said second and fourth flaps having an L-shaped slit therein, said L-shaped slits being located such that when said carton is erected from said planar blank, with said opposed free edges of said first and fourth side panels being connected such that said side panels form a tubular side wall, and when said second flap is rotated into coplanar relationship with said fourth flap, such that said second and fourth flaps are perpendicular to said side panels and overlie and are coplanar with said third flap, the spacing between said L-shaped slits is substantially similar to the width of said tapered locking tab of said first flap whereby said carton can be readily closed by rotating said first flap into said carton, with said tapered sides of said base portion of said first flap being operative to prevent interference between said first flap and said second and fourth flaps, thereby enabling said tapered sides of said locking tab to be received in said L-shaped slits for locking said erected carton.

2. A carton with a self-locking end closure comprising:

first, second, third and fourth side panels hingedly coupled at adjacent side edges thereof along fold lines; and first, second, third and fourth closure flaps hingedly coupled to said first, second, third and fourth side panels, respectively, at adjacent end edges thereof along fold lines, said first flap having a base portion adjacent said first panel and a locking tab remote from said first panel, said base portion being substantially in the form of an isoceles trapezoid tapering in a direction away from said first panel, and with said locking tab being substantially rectangular and tapered at its free end thereof in a direction away from said first panel, said first flap being free of fold lines, and with each of said second and fourth flaps having an L-shaped slit therein, said L-shaped slits being located such that when said second flap is rotated into coplanar relationship with said fourth flap, such that said second and fourth flaps are perpendicular to said side panels and overlie and are coplanar with said third flap, the spacing between said L-shaped slits is substantially similar to the width of said tapered locking tab of said first flap whereby said carton can be readily closed by rotating said first flap into said carton, with said tapered sides of said base portion of said first flap being operative to prevent interference between said first flap and said second and fourth flaps, thereby enabling said tapered sides of said locking tab to be received in said L-shaped slits for locking said carton.

* * * * *